No. 876,314. PATENTED JAN. 14, 1908.
C. H. BICKNELL.
NUT LOCK.
APPLICATION FILED JAN. 10, 1906.
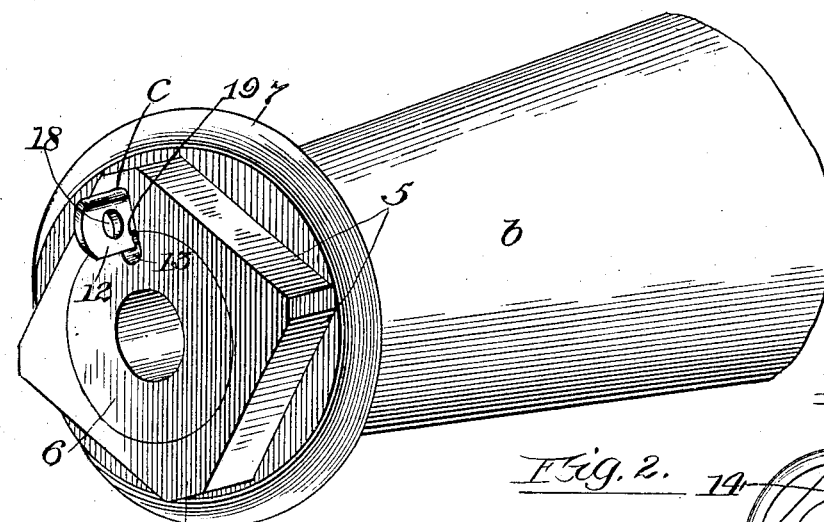
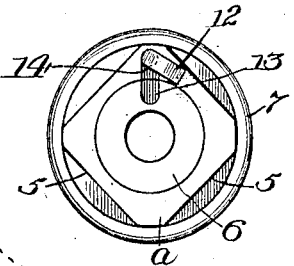
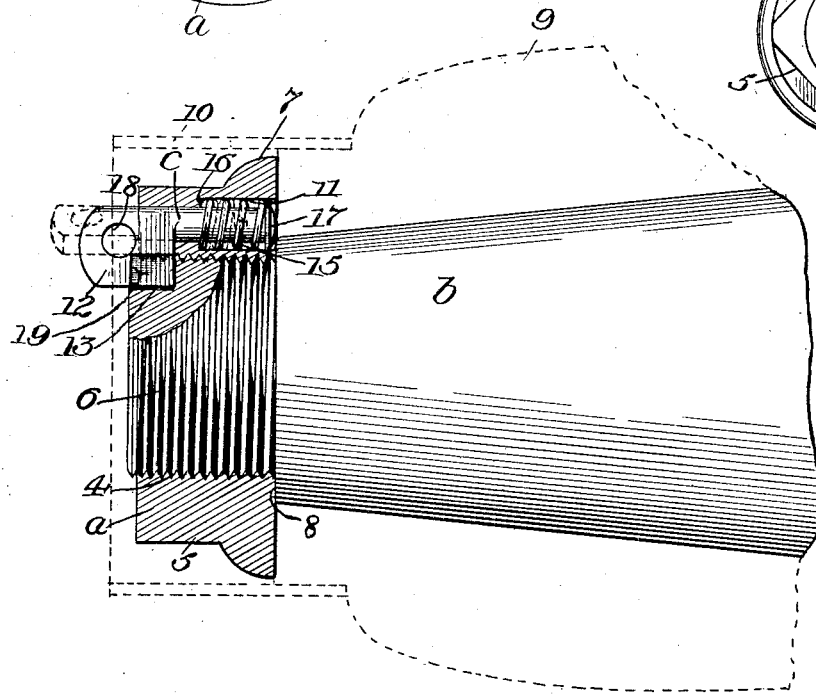
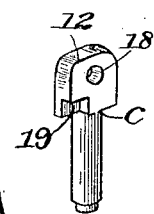
Witnesses:
Inventor:
Charles H. Bicknell
by Peirce & Fisher
Atty

UNITED STATES PATENT OFFICE.

CHARLES H. BICKNELL, OF MOLINE, ILLINOIS.

NUT-LOCK.

No. 876,314.

Specification of Letters Patent.

Patented Jan. 14, 1908.

Application filed January 10, 1906. Serial No. 295,420.

*To all whom it may concern:*

Be it known that I, CHARLES H. BICKNELL, a citizen of the United States, and a resident of Moline, county of Rock Island, and State of Illinois, have invented certain new and useful Improvements in Nut-Locks, of which the following is declared to be a full, clear, and exact description.

The improvement relates to nut-locks and more particularly to locks for the nuts of wheel axles.

The invention seeks to provide a simple, inexpensive and effective device which may be easily and readily manipulated to lock or release the nut, which requires no special form of wrench for the nut and which may be used upon a nut that is set within an extension flange on the end of the wheel hub.

With these and other objects in view, the invention consists in the novel features of construction, combination and arrangement of parts hereinafter set forth, illustrated in the accompanying drawing and more particularly pointed out in the appended claims.

In the drawing, Figure 1 is a perspective view showing the improved nut-lock mounted upon the end of a wheel axle. Fig. 2 is an elevation of the same with the nut and a portion of the axle shown in section, and with the outline of the hub indicated in dotted lines. Fig. 3 is a face view of the parts shown in Figs. 1 and 2 with the locking bolt shown in released position. Fig. 4 is a perspective view of the locking bolt.

In the form shown, the nut $a$ is provided with the usual inner, cylindrical screw-threaded surface or wall 4, and the outer rectangular or wrench-engaging surface or wall 5. The nut is shown as mounted upon the reduced threaded end 6 of the axle $b$, and the nut is also shown as provided at its inner end with a circular flange 7 that engages the shoulder 8 between the main portion of the axle $b$ and the screw-threaded end portion 6 thereof. Flange 7 of the nut also engages the end or outer face of the wheel hub 9. The wheel hub is often provided with a flange or collar 10 that embraces the end of the hub and projects outwardly over the nut when the latter is in position, as indicated in dotted lines in Fig. 2. The present improved form of lock for the nut may be used with a projecting flange or collar of this sort.

The nut is provided between its inner and outer walls and within one corner of the rectangular outer wall, with a socket or bore 11 that extends axially through the nut, *i.e.* in a direction parallel to the axis thereof. A locking bolt $c$ is arranged to shift longitudinally through the bore 11 and is provided, at its outer end, with a lateral off-set locking portion or lug 12 that is arranged to engage a notch 13 in the outer end portion of the axle. The off-set locking portion or lug 12 is in the form of a flattened wing or head and extends laterally, as shown, from the cylindrical body portion of the pin or bolt $c$. The notch 13 is cut radially in the edge of the reduced portion 6 of the axle $b$ and is open at the outer end of the same. The nut $a$ is provided with a corresponding notch 14 that extends inwardly from the upper end of the bore or socket 11. When the notches 13 and 14 on the nut and socket are in line, the locking bolt $c$ may be shifted to its innermost position with the flattened off-set lug or head 12 within the slots 13 and 14 to securely lock the nut in place. The locking bolt is held in innermost position with the flattened head or lug 12 against the inner ends of the notches 13 and 14 by a spring 15. This spring is coiled about the inner end of the bolt $c$ and arranged within the enlarged inner portion of the core or socket 11. One end of the spring abuts against a shoulder 16 within the bore or socket and its other end abuts against a collar or washer 17 fixed to the inner end of the locking bolt $c$.

For convenience in manipulating the locking bolt, the outer portion of its head or lug 12 is arranged to project beyond the end faces of both the axle and the nut when the bolt is in locking position and the outer projecting portion of the off-set head or lug 12 is provided with an opening 18 through which a nail or other implement may be inserted to move the bolt outwardly, should it become stuck in place. When it is desired to remove the nut, it is only necessary to move the bolt outwardly against the tension of the spring 15 and turn it to one side so that the lug or off-set head 12 engages the outer face of the nut, as indicated in dotted lines in Fig. 2 and as shown in full lines in Fig. 3. The locking bolt is then held in released position and the nut may be removed by a suitable wrench. It will be noted that the offset head or lug 12 of the bolt is flattened in a plane extending through the bolt or through the axis thereof so that the head or lug and the coöperating locking notches 13 and 14 have a comparatively large locking surface and the end of the locking bolt projects beyond the ends of the axle and nut. It will also be noted that the opposite sides or locking faces of the head and of the notches 13 and 14 are substantially parallel so that the locking head is held firmly in locked position.

It will be observed that the lock is very simple and inexpensive, may be readily manipulated, can be held in its released position so that the nut can be conveniently threaded on to the axle or removed therefrom, and moreover the locking bolt does not interfere with the use of any ordinary wrench.

While, as stated, the lock nut is particularly designed for use with wheel axles, it may be employed in other relations. It is obvious that changes may be made in the details of structure without departure from the essentials of the invention set forth in the claims.

The lower edge of the off-set head or lug 12 is preferably cut away at one side as at 19 in Figs. 2 and 4, so that the portion of the head or lug 12 within the notch 13 of the axle is narrower than the notch and the nut may be tightened up slightly in case the thread should become worn. The cut-away space 19 is on one or the other side of the lug 12 in accordance with the thread of the nut, i. e., if the nut is provided with a right-hand thread the cut-away space will be on one side of the lug and if the nut is provided with a left-hand thread the cut-away space will be on the other side of the lug.

Having described my invention, what I claim as new and desire to secure by Letters Patent, is:—

1. The combination with an axle and a hub thereon, said hub having an outwardly projecting overhanging flange, of a nut threaded on the end of said axle and arranged within said flange, said nut having a central internally threaded opening for engaging the end of said axle and also having an axially extending bore or socket between its inner and outer walls and a radial notch in its outer end face extending only between said bore or socket and the central opening of the nut, said axle having a corresponding, radial, outwardly extending notch in its outer end face, a locking bolt in said bore or socket having at its outer end an offset lug or head flattened in a plane extending through the axis of the bolt and adapted to set within the alined notches of said nut and axle and to project beyond the outer end faces both of said nut and of said axle, and a spring in the inner enlarged portion of said bore or socket, coiled about the inner end of said bolt and extending between a shoulder in said bore or socket and a washer fixed to the inner end of said bolt, said bolt being longitudinally movable to shift said head or lug into and out of said notches and rotatable, when said head or lug is withdrawn, to shift the same out of line with said notches, and said head or lug having a transverse opening in its outer portion that normally projects beyond the end faces of said nut and of said axle, substantially as described.

2. The combination with an axle, of a nut threaded thereon having an axially extending bore or socket between its inner and outer walls and a radial notch in the outer face thereof extending only between said bore or socket and the central opening of the nut, said axle having a corresponding outwardly extending notch in its outer face and a spring-held locking bolt in said bore or socket having a flat off-set lug or head arranged in the plane of said bolt and adapted to set within the alined notches of said nut and axle and project beyond the outer faces thereof, said bolt being longitudinally movable to shift said head or lug into and out of said notches and rotatable, when said head or lug is withdrawn, to shift the same out of line with said notches, the portion of said head or lug within the notch of said axle being cut away on one side, substantially as described and shown.

CHARLES H. BICKNELL.

Witnesses:
WILLIAM F. PETERS,
JOSEPH SCHMIDT.